3,282,993
CARBONYLATION PROCESS
Harry Chafetz, Poughkeepsie, and John A. Patterson, Fishkill, N.Y., assignors to Texaco Inc., New York, N.Y., a corporation of Delaware
No Drawing. Filed Feb. 19, 1962, Ser. No. 174,242
4 Claims. (Cl. 260—533)

This invention relates to an improvement in the production of carboxylic acid from olefins. More particularly, it pertains to a method of producing monobasic fatty acids by high pressure synthesis from olefins, carbon monoxide and water in the presence of an acidic catalyst whose reuse in said process is materially facilitated.

The production of fatty acids by high pressure synthesis from olefins, carbon monoxide and water in the presence of an acidic catalyst is well known. One of the earliest methods is described in U.S.P. 1,924,766 and is carried out under pressure of 200–1000 atmospheres at 300–400° C. in the persence of an acidic catalyst such as sulfuric acid. One of the major drawbacks of this early process was that the strongly corrosive action of the sulfuric acid catalyst was accentuated by the necessarily severe condition of pressure and temperature. A later development in the olefinic carbonylation process became known in the art as the Koch reaction. In the early Koch reaction, olefins and carbon monoxide were reacted in the presence of acidic catalyst and in the absence of water to form an intermediate anhydride which was subsequently converted into the fatty acid by hydrolyzing the anhydride with a stoichiometric amount of water. Under this procedure the reaction could be conducted at substantially reduced temperature such as between about −30° C. to +60° C. with the result that the corrosive conditions were considerably less severe than was the case in the prior carbonylation process. Unfortunately, the early Koch procedure did not permit the reuse of catalyst since the procedure called for separating fatty acid from catalyst by aqueous dilution. The dilution resulted in two layers, an aqueous acid layer and an organic fatty acid layer, which were separated from one another by standard means such as decantation. The aqueous catalyst layer was often discarded since the reconcentration of the acid therein was not economically feasible. Such continuous loss of catalyst in a commercial operation was a heavy burden from an economic standpoint. In an attempt to stem the catalyst waste a modification of the Koch process called for the use of $BF_3 \cdot H_3PO_4$ as catalyst which upon the addition of the stoichiometric amount of water to the reaction would permit the formation of two sharp layers of essentially anhydrous catalyst and fatty acid product. Unfortunately, the modified procedure has the handicap of being inflexible in the catalyst choice since it is limited to the $BF_3 \cdot H_3PO_4$ complex. Another handicap of said modified process is many of the olefins such as diisobutylene are not operative for the distinct layer separation since they form homogeneous final reaction mixtures.

We have discovered and this constitutes our invention, a modification of the standard Koch procedure which insures an essentially anhydrous two layer final reaction mixture and permits the economical recovery and reuse of catalyst without limiting the reaction to those particular olefins and catalyst. More particularly, our invention relates to the separation and recovery of the fatty acid product and acidic catalyst under essentially anhydrous conditions utilizing a selective solvent extraction to remove fatty acid product and reusing the separated catalyst in the process.

Specifically our process comprises a reaction of an olefin, carbon monoxide and essentially a stoichiometric amount of water in the presence of an inorganic acid carbonylation catalyst under an elevated carbon monoxide pressure, advantageously between about 400 and 50,000 p.s.i., and at a temperature between about −40 and 60° C., to form an essentially anhydrous final reaction mixture of fatty acid and said catalyst, then contacting with agitation the final reaction mixture under essentially anhydrous conditions with an organic solvent selective for said fatty acid but not for said catalyst at a temperature between about −40 and 75° C., separating the fatty acid containing solvent layer from the acid catalyst layer, recycling the acid catalyst layer to the initial reaction of said carbon monoxide and said olefin and separating the fatty acid product from said solvent layer. By essentially anhydrous we mean less than about 10% stoichiometric excess of water.

Under advantageous conditions the essentially stoichiometric amount of water expressed in terms of mol ratio of olefin reactant to water is between about 1:0.9 and 1:1.1. In addition, in the extraction of the fatty acid product from the final reaction mixture the volume ratio of selective solvent to final reaction mixture is desirably between about 1:1 and 20:1.

The olefins which may be employed in the procedure of the invention may be any of the alkenes having from 3 to 40 carbons such as butylene, diisobutylene, 2-methylhexene-3, and pentadecene-1. The branch chain olefins such as diisobutylene are particualrly suitable for the production of highly branched chained fatty acid which in turn when reacted with alcohols produce synthetic ester lubricating oils of good thermal stability.

The inorganic acid carbonylation catalyst which may be employed are any of the standard Koch reaction catalysts such as sulfuric acid, hydrochloric acid, phosphoric acid, hydrofluoric acid, monohydroxy fluoroboric acid and boron trifluoride complexes resulting from the reaction of boron trifluoride with mineral acids.

The boron trifluoride mineral acid complexes are prepared by saturating the acids such as phosphoric and sulfuric with gaseous boron trifluoride at an elevated temperature such as 100° C. which results in a complex product wherein the trifluoride and acid components are in about a 1:1 mol ratio, e.g., $BF_3 \cdot H_3PO_4$ and $BF_3 \cdot H_2SO_4$.

Under the advantageous conditions the catalysts is present in the reaction in a mol ratio of olefin to catalyst of between about 1:1 and 1:20.

Suitable organic solvents for fatty acid product extraction are, for example, liquid alkanes which have a boiling point different and advantageously lower than the carbonylation product and are essentially immiscible in water. Specific examples of the liquid alkanes contemplated herein are the $C_3$ to $C_{20}$ alkanes such as hexane, isooctane, decane and tetradecane.

In the extraction step of the process any of the standard solvent extraction procedures can be employed. For example, in one procedure the extraction solvent and final reaction product are contacted with one another under mixing conditions. Then upon cessation of mixing the extraction mixture is allowed to form two layers followed by the separation of the fatty acid enriched solvent layer from the acid layer by decantation. This procedure is particularly adaptable to a batch type operation. Alternatively, a procedure particularly adaptable in a continuous process is where the final reaction mixture is introduced at the top of an elongated extraction column and the selective extraction solvent is introduced at the bottom of said column. The extractant and product being passed in countercurrent flow to one another thereby accomplishing the transfer of the fatty acid product to extractant. The fatty acid enriched solvent is then withdrawn from the top of the extraction column and the acid catalyst withdrawn from the bottom.

Whether a batch or continuous extraction procedure is employed, the recovered catalyst and solvent may be sent to storage for eventual reuse or may be immediately recycled to the initial carbon monoxide-olefin reaction.

The following example will further illustrate this invention. The invention is not to be restricted by this example.

*Example 1*

A 1,530 ccs. stainless steel autoclave equipped with a motor driven stirrer and capable of operating up to 10,000 p.s.i.g. was purged with carbon monoxide and then pressured with carbon monoxide to about 3,000 p.s.i. Following the carbon monoxide pressuring, liquid $BF_3 \cdot H_3PO_4$ catalyst was introduced into the reactor. Then while holding the reactor at an autogenous temperature, diisobutylene was pumper into the reactor at a rate of about 2 ccs./minute. After each addition of approximately 1 mol of diisobutylene, 15 to 20 ccs. of water was pumped into the reactor. The cycle of diisobutylene and water addition was repeated until the amounts recited in following Table A were charged. During the addition, the reaction temperature averaged out to that given in Table A. Usually at the end of the run the temperature was higher than at the beginning.

In each run and after the last addition of water the reaction mixture was stirred for approximately a half hour and then was degased and the product removed from the reactor. The removed liquid product was a homogeneous solution and was contacted in a stirred container with isooctane for 5 minutes at 20–30° C. Upon cessation of the stirring two layers were formed and the upper isooctane layer was decanted and distilled to a 140–160° C. pot temperature. The distillation residue was further fractionated under reduced pressure of 20 mm. Hg and fraction collected at 128–133° C. was identified as 2,2,4,4-tetramethylpentanoic acid. Further analysis of the remaining fractions determined the presence of $C_5$ to $C_{13}$ monobasic fatty acids. The foregoing procedure was repeated three additional times with the catalyst in Run 1 being consecutively reused in Runs 2, 3, and 4.

The acid catalyst employed in the foregoing procedure was prepared by placing concentrated phosphoric acid in a 3-neck flask (equipped with a condenser, thermometer and gas inlet tube) heated to a temperature of 100° C. Gaseous boron trifluoride was introduced in excess for a period of about four hours while maintaining the reaction temperature at between about 100–130° C.

The reactants, catalyst, product and reaction data in which the catalyst is reused are reported below in Table A:

One surprising feature of the invention can be seen from the above tabled data. It appears the catalyst increases its activity when recovered by solvent extraction in the process of the invention. For example, the fatty acid yields in Runs 3 and 4 are substantially above the yields of Runs 1 and 2.

We claim:

1. In a method for producing a monobasic fatty acid by contacting an olefin, carbon monoxide and essentially a stoichiometric amount of water under an elevated carbon monoxide pressure of between about 400 and 50,000 p.s.i., at a temperature between about −40 and 60° C., and in the presence of an inorganic acid carbonylation catalyst to form said fatty acid: the improvement which comprises contacting the final reaction mixture under essentially anhydrous conditions with a $C_3$ to $C_{20}$ liquid alkane at a temperature between about −40 and 75° C. to form a fatty acid containing solvent phase and catalyst phase, separating the two phases from one another, subsequently separating said fatty acid from said solvent phase and recycling the separated catalyst to said olefin and said carbon monoxide reaction.

2. In a method for producing a monobasic fatty acid by contacting a $C_3$ to $C_{40}$ alkene with carbon monoxide and water in a mol ratio of said alkene to said water of between about 1:0.9 and 1:1.1 under a carbon monoxide pressure of between about 400 and 50,000 p.s.i. and at a temperature between about −40 and 60° C., and in the presence of an inorganic acid carbonylation catalyst, said catalyst being present in a mol ration of olefin to catalyst of between about 1:1 and 1:20: the improvement which comprises contacting the final reaction mixture under essentially anhydrous conditions with a $C_3$ to $C_{20}$ liquid alkane at a temperature between about −40 and 75° C. to form a fatty acid containing solvent phase and a catalyst phase, the volume ratio of said solvent to said final mixture being between about 1:1 and 20:1, subsequently separating said fatty acid from said solvent phase and recycling (1) the separated catalyst to said olefin and said carbon monoxide reaction and (2) the recovered solvent to said final reaction mixture for reuse.

3. A method in accordance with claim 2 wherein said monobasic fatty acid is 2,2,4,4-tetramethylpentanoic acid, said alkene is diisobutylene, said catalyst is $BF_3 \cdot H_3PO_4$ and said solvent is isooctane.

4. In a method for producing a monobasic fatty acid by contacting a $C_3$ to $C_{15}$ alkene, carbon monoxide and an essentially stoichiometric amount of water under an elevated carbon monoxide pressure of between about 400 and 50,000 p.s.i. at a temperature between about −40 and 60° C. and in the presence of an inorganic acid carbonylation catalyst to form said fatty acid, said catalyst selected from the group consisting of sulfuric acid, hydrochloric

TABLE A

| Description | Run 1 | Run 2 | Run 3 | Run 4 |
|---|---|---|---|---|
| Reactants, gms.: | | | | |
| Diisobutylene | 518 | 460 | 468 | 518 |
| CO | 125 | 152 | 161 | 115 |
| Water | 90 | 72 | 70 | 88 |
| Catalyst: | | | | |
| Name | $H_3PO_4 \cdot BF_3$ | Cat. Run 1 | Cat. Run 2 | Cat. Run 3 |
| Amt., gms | 935 | 854 | 787 | 715 |
| Reaction Conditions: | | | | |
| Avg. Temp.,° C | 32 | 27 | 31 | 23 |
| Avg. Pres., p.s.i.g | 3,360 | 3,240 | 2,410 | 3,370 |
| React. Time, Hrs | 6 | 8½ | 6 | 9½ |
| Extraction Conditions: | | | | |
| Gms. React. Mixt./Gms. Isooctane | 1.1 | 1.1 | 1.1 | 1.1 |
| Temp.,° C | 30 | 30 | 30 | 30 |
| Product [1]: | | | | |
| Amt., gms | 623 | 580 | 729 | 776 |
| Neut. No | 286 | 292 | 291 | 315 |
| Yield, wt. percent [2] | 120 | 126 | 156 | 150 |

[1] $C_5$ to $C_{13}$ monobasic fatty acid residue after stripping isooctane extracts to pot temperature of 140–160° C.
[2] Based on weight of olefin reactant.

acid, phosphoric acid, hydrofluoric acid, monohydroxy fluoroboric acid, $BF_3 \cdot H_3PO_4$ and $BF_3 \cdot H_2SO_4$: the improvement which comprises contacting the final reaction mixture under essentially anhydrous conditions with $C_3$ to $C_{14}$ liquid alkane at a temperature between about $-40$ and $75°$ C. to form a fatty acid containing solvent phase and catalyst phase, separating the two phases from one another, subsequently separating said fatty acid from said solvent phase and recycling the separated catalyst to the olefin and carbon monoxide reaction phase.

References Cited by the Examiner

UNITED STATES PATENTS

| | | | |
|---|---|---|---|
| 2,831,877 | 4/1958 | Koch | 260—533 |
| 3,059,004 | 10/1962 | Waale et al. | 260—533 |

LORRAINE A. WEINBERGER, *Primary Examiner.*

CHARLES B. PARKER, *Examiner.*

G. P. D'ANGELO, S. B. WILLIAMS,
*Assistant Examiners.*